Patented Mar. 9, 1954

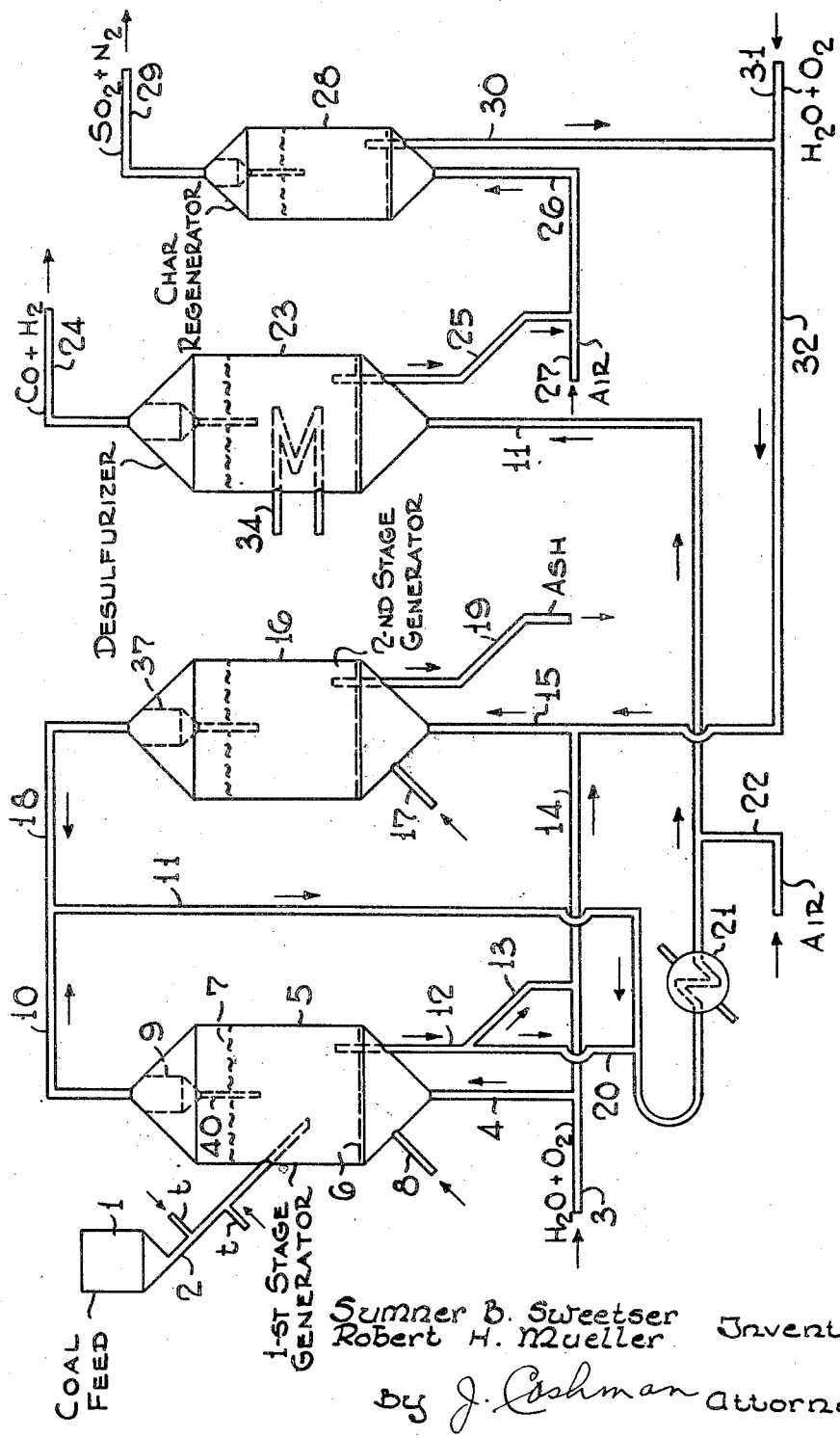

2,671,722

UNITED STATES PATENT OFFICE 2,671,722

SYNTHESIS GAS DESULFURIZATION

Sumner B. Sweetser, Cranford, and Robert H. Mueller, North Plainfield, N. J., assignors to Standard Oil Development Company, a corporation of Delaware Application March 23, 1950, Serial No. 151,326

5 Claims. (Cl. 48—206)

The present invention relates to the production of gases from non-gaseous carbonaceous materials, particularly to the production of gas mixtures containing CO and $H_2$ from such non-volatile carbonaceous materials as coke, coal, oil shale, heavy oil residues, and the like. More specifically, the present invention relates to an improved process for producing gas containing CO and $H_2$ from coke or coal by the water gas reaction and making the gas thus produced more suitable for utilization in the hydrocarbon synthesis reaction.

In a co-pending application, Serial No. 151,482, filed March 23, 1950, in the name of Charles E. Jahnig and Edward J. Gornowski, there is disclosed a process for desulfurizing water gas by means of a spent char.

It has long been known that non-volatile fuel materials, such as coke, coal, and the like, may be converted into more valuable gases which can be more easily handled and more efficiently used for a greater variety of purposes. One of the most widely practiced gas-generating conversions is the so-called water-gas process in which solid fuels, such as coal or coke of any origin, may be reacted with steam at temperatures of about 1400–2400° F. to produce water-gas or producer-gas mixtures of CO and $H_2$ in varying proportions, depending mainly on the conversion temperatures, which may vary from about 1400° to about 2400° F., and the ratio of steam and air to coke. The flexibility of the process may be illustrated by a series of possible chemical reactions about as follows:

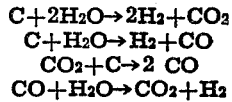

$$C + 2H_2O \rightarrow 2H_2 + CO_2$$
$$C + H_2O \rightarrow H_2 + CO$$
$$CO_2 + C \rightarrow 2\ CO$$
$$CO + H_2O \rightarrow CO_2 + H_2$$

The overall water-gas reaction being endothermic, heat must be supplied which is usually accomplished by the combustion of a portion of the carbonaceous feed with an oxidizing gas such as air and/or oxygen at about 1600°–3000° F. The combustion reaction may be carried out either simultaneously with the water-gas reaction or alternately in a make and blow fashion.

It will be appreciated from the above that the water-gas process permits the production of gas mixtures of widely varying composition and B. t. u. content. The process as such is therefore well suited not only for the production of fuel gases of varying B. t. u content but also for the production of feed gases for hydrogenation processes and particularly for the catalytic synthesis of hydrocarbons and/or oxygenated organic compounds from CO and $H_2$ which, depending on the products desired, requires $H_2$:CO ratios varying within the wide limits of 0.5–5 or more volumes of $H_2$ per volume of CO.

However, the technical utilization of the water-gas process, particularly for hydrogenation processes and the production of synthesis feed gas, has been appreciably impeded by difficulties encountered in heat supply and continuous operation as well as in the substantial removal of sulfur compounds from the gas, the latter being imperative for the utility of the gas in the hydrocarbon synthesis. The problems of supplying heat of reaction, with continuity of operation have been satisfactorily solved heretofore, by the application of the so-called fluid solids technique wherein the carbonaceous charge is reacted in the form of a dense turbulent mass of finely-divided solids fluidized by the gaseous reactants and products. However, substantial and economic desulfurization of the water-gas still constitutes a major problem particularly in practicing the hydrocarbon synthesis based on coal.

The catalysts used in the synthesis of hydrocarbons from CO and $H_2$ are sensitive to sulfur poisoning and consequently, it is necessary to use a synthesis gas which is low in sulfur. Because of the low sulfur content of some sources of natural gas, it is sometimes unnecessary to desulfurize the synthesis gas prepared from natural gas. Most coals, however, contain appreciable quantities of sulfur and in the preparation of synthesis gas from coal it is always necessary to treat the gas for sulfur removal prior to contacting the synthesis gas with the synthesis catalyst.

Types of sulfur compounds found in water or producer gas are, for instance, $H_2S$, COS, $CS_2$, thiophene, etc. These types of sulfur compounds, due to their different chemical character, cannot be removed by any known single desulfurization treatment. Therefore, it has been the practice heretofore first to remove $H_2S$, for example, by a treatment with alkali, hydrated iron oxides, sodium thioarsenate (Thylox process), sodium phenolate (Koppers process), etc., and then to remove the organic sulfur compounds, for example, either by a conversion into $H_2S$ in the presence of steam and noble metal catalysts followed by a second $H_2S$ removal, or by a single high-temperature catalytic treatment with lead or tin catalysts, etc. The desulfurization procedure requiring separate stages of different design and operating conditions for removal of different types of sulfur compounds constitutes a heavy load on the economy of any gas utilization depending on sulfur-free fuel gases of which hydrocarbon synthesis is an outstanding example.

The present invention overcomes the aforementioned difficulties and affords various additional advantages. These advantages, the nature of the invention and the manner in which it is carried out will be fully understood from the following description thereof read with reference to the drawing which shows a semi-diagrammatic view of apparatus particularly adapted to carry out the invention.

It is, therefore, the principal object of the present invention to provide an improved process for the production of highly valuable combustible gases from solid carbonaceous materials.

Another object is to provide economic means for the substantial desulfurization of combustible gases obtained from solid carbonaceous materials.

A still further object of the invention is to provide an improved process for the removal of sulfur from gases containing CO and $H_2$ produced from solid carbonaceous materials.

A more specific object of the invention is to provide an improved water-gas process for the production of gas mixtures substantially free of sulfur, suitable for the catalytic synthesis of hydrocarbons and/or oxygenated organic compounds from CO and $H_2$.

Other and further objects and advantages will appear hereinafter.

When solid carbonaceous fuels such as coke or coals are treated at high temperatures with steam for the purpose of generating water gas it has been found that the carbonaceous material acquires a very high surface area, of the order of 500–800 m.$^2$/gram. It has further been found that the surface area of a low temperature coke undergoing gasification in the water gas reaction in the water gas generator goes through a maximum as shown in the tabulation below:

*Surface area vs. coke carbon content*

| Percent Carbon | Surface Area, m.$^2$/g. |
|---|---|
| 84 (Fresh) | 0.04 |
| 56 | 680 |
| 27 | 360 |
| 17 | 200 |
| 5 | 60 |

In accordance with the present invention, this carbonaceous solid of high surface area, formed in the water gas generator, is employed to desulfurize the gases generated in said generator to prepare a gas suitable for employment in the hydrocarbon synthesis reaction.

Though the use of carbon activated by conventional means, such as by physical or chemical processes, i. e., steam, zinc chloride, potassium sulfide, etc. have been employed hitherto for processes requiring removal of undersirable constituents from gases or liquids is well known, the relatively high cost of these activated carbons and the difficulty of regenerating the adsorbent without consuming the latter has prevented the commercial application of this type of desulfurizing agent for the hydrocarbon synthesis process.

The discovery that coke produced in the water gas reaction has a maximum surface area at a relatively high carbon concentration, and that surface area decreases rapidly with decrease in carbon content, has now been applied to the combination process of preparing hydrocarbon synthesis or fuel gas by coal gasification and concomitant preparation of a highly absorptive and active char, and employing the latter in desulfurizing the gas thus obtained, whereby mercaptans, thiophene, COS, $CS_2$, and $H_2S$ are removed from the synthesis gas. This discovery enables one thus to obtain both the highest possible surface area and concomitant activity of the char, and also to obtain maximum utilization of the carbon comprising the char.

In accordance with the present invention, the water gas generation system is preferably operated in two or more stages and coke is withdrawn from the first stage for utilization in the desulfurization step. The distribution of load between stages is such that the coke withdrawn from the first stage has a surface area of at least about 350 square meters per gram. Though preferably, all the first stage char is employed in the desulfurizing operation, in certain cases as when a low sulfur coal is being processed, it may be desirable to pass only a portion of the active char to the desulfurizer, the balance being sent to the second stage gasification unit and substantially consumed in the production of water gas for fuel or hydrocarbon synthesis purposes, in accordance with conventional water gas production techniques.

In one form of operation of this combination process employing the fluidized solids technique, fresh coal or coke is added from a feed hopper to the first stage gasification reactor. A mixture of steam and oxygen is also fed to the first stage reactor under conditions to form a fluid bed and to cause the reaction of the steam and carbon to take place with the formation of carbon monoxide and hydrogen. The residence time of the carbonaceous feed in the first stage gasification reactor is regulated to produce a char of high surface area. In general, the residence time in the first stage reactor is adjusted so that the char withdrawn from this reactor has a carbon content in the range of 45 to 75%. Char is withdrawn through a bottom draw-off line and split into two streams. One stream is mixed with additional steam and oxygen and passed into the second stage gasification vessel. In this vessel conditions are likewise adjusted to form a fluid bed in which steam reacts with carbon with the production of carbon monoxide and hydrogen. The second part of the stream of high surface area char withdrawn from the first stage gasification vessel is picked up by the combined streams of synthesis gas from the first and second stage gasification vessels and after mixing with one to two percent air based on the volume of the synthesis gas or about 100–150% of the stoichiometric amount required to oxidize $H_2S$ to sulfur, is passed into a third vessel where a fluid bed of the activated char is maintained by the passage of the synthesis gas and air mixtures therethrough. The desulfurization reactor is maintained at temperatures of about 75°–400° F. It is thus necessary to provide heat exchange for cooling the hot char from the first stage generator to about 75°–400° F. Organic sulfur compounds such as COS, $CS_2$ and thiophene are adsorbed on the char. Hydrogen sulfide is oxidized by the air to form free sulfur which is deposited on the carbon. This reaction is exothermic so cooling coils or other means of heat exchange are required to maintain the bed temperature within the above range. In some cases it may be desirable to operate two or more beds of activated char in series to desulfurize the gas. Likewise, a single baffled reactor adapted to give countercurrent contacting may be employed. The purified synthesis gas is carried overhead from the desulfurization stage and is ready for use in the synthesis reaction, after small amounts of any residual sulfur have been removed by conventional means. The char containing the sulfur deposited or adsorbed thereon is withdrawn through a bottom draw-off line, picked up in a stream of air and transported to a fourth fluid reactor where sulfur is removed from the activated char by combustion. The residence time in this combustion vessel is regulated to burn off all of the sulfur with a minimum combustion of the carbon in the activated char. The sulfur dioxide and the flue gases carried overhead from this vessel may be treated for the production of sulfuric acid if desired. The char from which the sulfur has been removed is withdrawn through a bottom draw-off line, picked up in a stream of steam and oxygen and passed into the second stage gasification vessel where the char is utilized further for the production of carbon monoxide and hydrogen. Spent coke or ash containing from 5 to about 25% carbon may be withdrawn from the bottom of the second stage gasification vessel.

Having set forth its general nature and objects, the invention will best be understood from the subsequent more detailed description wherein reference will be made to the accompanying drawing which illustrates a system suitable for carrying out a preferred embodiment of the invention.

Referring now to the drawing, fresh coke or coal ground to a finely divided form, preferably capable of passing through a 60 mesh screen and even through a 100 mesh screen, is fed from supply hopper 1 into standpipe 2 which is provided with a plurality of taps $t$ through which slow currents of air, superheated steam, or other aerating gas may be injected in order to aerate and suspend the coke or coal therein. The suspension is introduced into generator 5, wherein it is formed into a dense bed fluidized by a mixture of oxygen and superheated steam admitted through lines 3 and 4. Due to the superficial velocity of said steam and oxygen, which is maintained within the limits of from about 0.2 to 3 feet per second, the coke or coal is formed into a dense, turbulent, ebullient mass resembling a boiling liquid and having a well defined upper level 7. Additional oxidizing gases, as air or oxygen, may be admitted through line 8. The steam and carbonaceous material react to form water gas, a gasiform product containing carbon monoxide and hydrogen. The temperature in this zone is of the order of 1700° to 1900° F. and the gas pressure is preferably from atmospheric to about 100 p. s. i. g., although pressures up to 500 p. s. i. g. may, under certain conditions, be employed. The heat required for the reaction is furnished substantially by the combustion of part of the carbonaceous solids in reactor 5 by the oxygen admitted through lines 8 and/or 3. The total supply of oxygen is carefully controlled to generate sufficient heat by combustion to satisfy the heat requirements of the process. It is understood that under the reaction conditions, when fresh coal is employed as the fresh feed it becomes rapidly coked in the fluidized bed in generator 5, so that the solid product subsequently withdrawn is referred to as coke rather than coal.

The gaseous products are withdrawn from generator 5 through a dust separator, such as cyclone 9 with a dip line 40 extending below upper level 7 of the fluidized bed for the return of separated dust particles. The water gas is then passed through lines 10 and 11 for sulfur removal in the manner described below.

The hot carbonaceous solids are allowed to remain within reactor 5 for a sufficient period of time to attain the surface area desired, usually greater than 500 m.$^2$/g., and then the hot carbonaceous solids are continuously withdrawn from water gas generator 5 through aerated bottom draw-off pipe 12 which extends above grid 6. The period of residence of the coke or coal within reactor 5, in order to attain the high surface area desired, depends upon a plurality of operating factors, such as type of coal fed, temperature of gas generation, ratio of steam to coke fed in the reactor, solids hold-up time, etc. In general, the residence time and the variables above are so regulated and adjusted that the char withdrawn from reactor 5 has a carbon content in the range of about 45–75%.

The char withdrawn through line 12 is then split into two streams. One stream is passed through line 13, mixed with additional steam and oxygen introduced through line 3, and the resulting suspension of char, superheated steam, and oxygen is passed through lines 14 and 15 into the lower portion of second stage water gas generator 16 which is essentially the same type as vessel 5 and is fitted at its lower portion with an inlet line 17 for admitting additional oxidizing gas, such as air or oxygen.

The fluidized carbonaceous material in generator 16 is in the form of a dense, turbulent mass fluidized by the upwardly flowing gases and superheated steam. Gasification of the carbon by the steam in the second stage reactor proceeds rapidly to form CO and $H_2$, the heat required for the endothermic gasification being supplied by the combustion of part of the carbonaceous solids. The temperature in 16 is maintained at about 1700°–1900° F. and the pressure may be up to 400 p. s. i. g. or higher. The gasification products are withdrawn through cyclone 37 and the gases passed overhead through line 18 for further treatment as described below. Within second stage reactor 16, the coke is consumed in the gasification reaction to any desired residual carbon content, and spent coke or ash, containing from about 5 to about 25% carbon may be withdrawn from 16 through bottom drawoff line 19 for discharge from the system.

The high surface area char to be used in desulfurizing the water gas from both gasification stages, and which is withdrawn through line 12 from first stage generator 5, is passed through standpipe 20 to line 11, where the char is picked up by the combined streams of synthesis gas from generators 5 and 16. The char is suspended in line 11, passed through a series of coolers and/or heat exchangers, one of which is shown in the drawing as heat exchanger 21. The suspension of char in water gas is admixed with a small amount of air, preferably about 1 to 2%, based on the volume of gas to be treated, depending upon the amount of $H_2S$ in the gas, which is admitted through line 22. The suspension of char, sulfur-contaminated water gas, and air is passed into desulfurizing vessel 23, wherein a fluid bed of the activated char is maintained by the passage of gas mixtures therethrough. In general, it is desirable to maintain the temperature within desulfurizer 23 at about 75° to 400° F., hence the preceding coolers and heat exchangers. Furthermore, it is also desirable to maintain cooling means, such as cooling coil 34 to maintain the desired desulfurizing temperatures. For most effective desulfurization, the ratio of gas to char is of the order of 25 to 100 standard cubic feet of gas/lb. char. Organic sulfur compounds, such as $CS_2$, COS, mercaptans, thiophene and the like are adsorbed on the char, whereas hydrogen sulfide is oxidized by the air to form free sulfur which in turn is deposited on the carbon, the exothermic heat of reaction being dissipated by means of coil 34. Pressures within 23 are of the same order of magnitude as in the gas generators and depend upon the pressure employed in the subsequent hydrocarbon synthesis reaction.

Purified water gas from which the bulk of the organic and inorganic sulfur compounds have been removed is withdrawn upwardly from generator 23 through line 24. If desired, last traces of $H_2S$ may be removed by any conventional process; and the desulfurized gas is ready for use as a fuel gas, for the synthesis of hydrocarbons and oxygenated organic compounds, etc., though this last step is usually not required for fuel gases.

The char containing sulfur adsorbed and deposited thereon is withdrawn through bottom drawoff line 25, picked up and suspended in line 26 by a stream of air admitted through line 27, and passed to regeneration vessel 28, wherein, also utilizing the fluid solids technique, sulfur is removed from the activated char by combustion. The residence time in this combustion vessel is regulated to burn off all the sulfur with a minimum combustion of the carbon in the activated char. Reaction conditions within regenerator 28 may include temperatures in the range of about 800°–1100° F., pressures up to about 500 p. s. i. g., depending upon the pressures employed in the gasification and desulfurizing system, and superficial velocities of about 0.5–3.0 feet per second. The hold-up time may vary with the temperature to get the bulk of the sulfur off with minimum combustion of carbon.

From above the dense fluidized bed in regenerator 28, flue gases comprising $SO_2$ and $N_2$, and probably a minor amount of $H_2O$ and oxides of carbon are withdrawn through line 29 and may be treated in any manner desired, as for the production of sulfuric acid or elementary sulfur, etc., or they may be discarded after appropriate heat exchange. The char from which the sulfur has been removed is withdrawn through bottom draw-off line 30, suspended in a stream of superheated steam and oxygen admitted through line 31, and the suspension is passed to second stage gasification zone 16 through lines 32 and 15 for further conversion into water gas.

The embodiment of the invention illustrated by the drawing permits of numerous modifications. Thus in case where the coal or coke is of relatively low sulfur content, instead of combining the overhead synthesis gas streams from both the water gas generators as shown, it may be desirable to by-pass the synthesis gas from the second stage gasification vessel and treat only the gas from the first stage in the desulfurizing zone, thus markedly increasing the capacity of the system. The two streams of synthesis gas may then be blended after the synthesis gas from the first stage vessel has been desulfurized.

Furthermore, in some cases it may be desirable to operate two fluid beds in series instead of a single bed to desulfurize the gas.

While the invention has been described in connection with a gasification system feeding oxygen with steam to generate the necessary amount of heat required for the endothermic reaction of carbon with steam, the invention may also be practiced with other systems for supplying heat, as for example, by circulation of hot solids derived either from an extraneous source or which derive from spent char burned in a combustion zone to a temperature above water gas generation temperatures. Also, it may be desirable to employ substantially all the char from the first stage reactor in the desulfurizer.

The invention may be further illustrated by the following specific examples.

Example I

A mixture of carbon monoxide and hydrogen containing 1% air and 660 grains of sulfur per 100 cubic feet of gas was passed through a bed of partially spent coke at 400° F., atmospheric pressure and a space velocity of 1000 v./v./hr. The sulfur in the gas consisted of 600 grains as hydrogen sulfide, 30 grains as thiophene and 30 grains as tertiary butyl mercaptan. The coke employed as treating agent had been used for water gas generation, contained 75% carbon, 2% sulfur and had a surface area of 585 m.²/g. A sample of the treated gas collected during a 20 minute period ending 40 minutes from the start of the run was found by analysis to contain 25 grains of sulfur per 100 cubic feet.

Example II

A mixture of carbon monoxide and hydrogen containing 1.5% air and 275 grains of sulfur per 100 cubic feet was passed through a bed of the same coke used in Example I at 400° F., atmospheric pressure and a space velocity of 1000 v./v./hr. The sulfur in the gas consisted of 240 grains as hydrogen sulfide and 35 grains as thiophene and tertiary butyl mercaptan. A sample of the treated gas collected during the first 20 minutes of the run was found by analysis to contain 13 grains of sulfur per 100 cubic feet of gas.

Example III

A mixture of carbon monoxide and hydrogen containing 1.5% air and 275 grains of sulfur per 100 cubic feet was passed through a bed of partially spent coke at 400° F., atmospheric pressure and a space velocity of 1000 v./v./hr. The sulfur in the gas consisted of 250 grains as hydrogen sulfide and 25 grains as thiophene plus tertiary butyl mercaptan. The coke employed had been used in water gas generation and contained 48% carbon and 1.7% sulfur. A sample of treated gas collected during a 20 minute run was found by analysis to contain 24 grains of sulfur per 100 cubic feet of gas.

While the foregoing description and exemplary operation have served to illustrate specific applications and results of the invention, other modifications obvious to those skilled in the art are within its scope.

What is claimed is:

1. An improved process for producing mixtures of CO and $H_2$ which comprises passing a stream of finely divided carbonaceous solids into an initial gasification zone, forming a fluidized mass of solids therein, subjecting said mass to a gasification reaction with steam at gasification temperatures to produce a gas rich in $H_2$ and CO and containing sulfur compounds and char particles of high surface area having a carbon content of from about 45 to about 75%, withdrawing said gas from said zone, withdrawing from said zone a fluidized stream of finely divided particles of said high surface area char and passing said char to a gas desulfurization zone, maintaining said char particles therein as a fluidized bed, contacting said sulfur containing gas with said fluidized bed of char particles in said last-named zone at a temperature of from about 75° to 400° F. in the presence of a small amount of added air for a period sufficient to effect the removal of a major portion of the sulfur compounds from said gas by said char particles, withdrawing a gas substantially free of sulfur compounds from said zone, withdrawing spent char from said desulfurizing zone, passing said spent char to a regeneration zone, removing sulfur from said spent char in said last-named zone, and passing regenerated char to a second stage water gas generation zone.

2. The process of claim 1 wherein water gas from said second stage gasification zone is passed to said desulfurizing zone.

3. The process of claim 1 wherein said spent char is regenerated with air in a fluidized reaction zone.

4. The process of claim 1 wherein heat is supplied to said gasification zones by feeding oxygen thereto.

5. An improved process for producing mixtures of CO and $H_2$ substantially free of sulfur which comprises passing a stream of finely divided carbonaceous solid material into a gasification zone, forming a fluidized mass of solids therein, subjecting said mass to a gasification reaction with steam at gasification temperatures to produce a water gas containing sulfur compounds and char particles of high surface area having a carbon content of from about 45 to about 75%, withdrawing said gas from said zone, withdrawing from said gasification zone a fluidized stream of said high surface area char particles, continuously passing at least a portion of said freshly produced char particles to a gas desulfurization zone, contacting said water gas with said fresh char in said last-named zone at a temperature of from about 75° to 400° F. for a period sufficient to effect the removal of a major portion of the sulfur compounds from said water gas by said char particles, and withdrawing a purified gas from said zone.

SUMNER B. SWEETSER.
ROBERT H. MUELLER.

References Cited in the file of this patent

UNITED STATES PATENTS

| Number | Name | Date |
|---|---|---|
| 1,582,718 | Winkler | Apr. 27, 1926 |
| 1,641,053 | Sauer | Aug. 30, 1927 |
| 1,826,209 | Godel | Oct. 6, 1931 |

FOREIGN PATENTS

| Number | Country | Date |
|---|---|---|
| 216,761 | Great Britain | June 5, 1924 |
| 310,063 | Great Britain | Oct. 20, 1927 |
| 478,877 | Great Britain | Jan. 21, 1938 |